(No Model.)
H. O. CHENEY.
STEAM COOKING UTENSIL.
No. 540,852. Patented June 11, 1895.
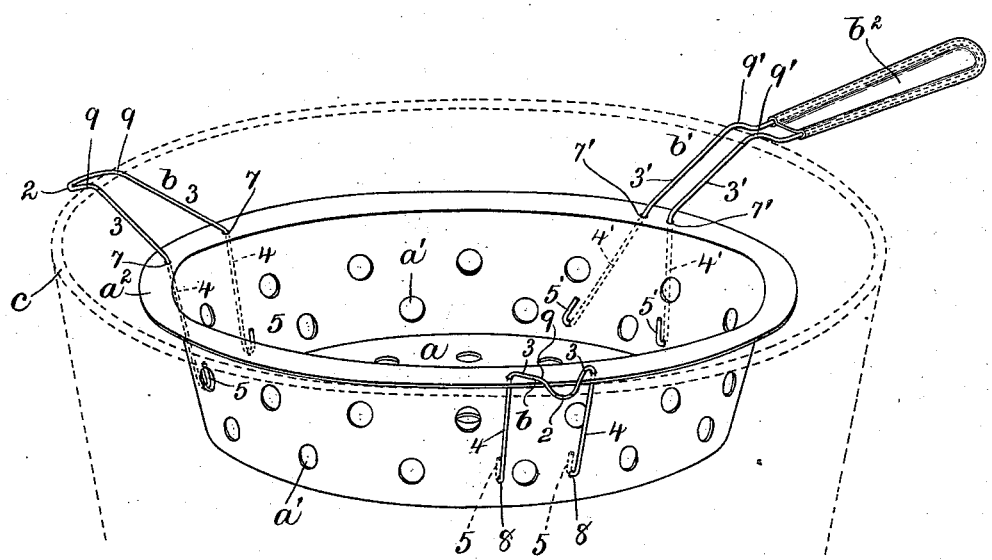
Witnesses:
A. D. Harrison
Rollin Abell
Inventor:
H. O. Cheney
by Wright Brown & Quinby
Attys.

UNITED STATES PATENT OFFICE.

HENRY O. CHENEY, OF HOPKINTON, MASSACHUSETTS, ASSIGNOR OF ONE-HALF TO WILLARD F. WHEELER, OF SAME PLACE.

STEAM COOKING UTENSIL.

SPECIFICATION forming part of Letters Patent No. 540,852, dated June 11, 1895.

Application filed November 22, 1894. Serial No. 529,595. (No model.)

*To all whom it may concern:*

Be it known that I, HENRY O. CHENEY, of Hopkinton, in the county of Middlesex and State of Massachusetts, have invented certain new and useful Improvements in Steam Cooking Utensils, of which the following is a specification.

This invention relates to cooking utensils constructed to be suspended in the upper portion of a kettle so as to subject the food to be cooked to the action of steam generated in the kettle.

The invention consists in a cooking utensil comprising a perforated sheet-metal vessel having an outwardly projecting flange at its upper edge, and loop-shaped wire arms formed to bear on the edge of the kettle and to support the vessel therein, the parts or members of each arm extending through the flange and downwardly therefrom on the outer surface of the vessel and through the body of the vessel near the bottom thereof, one of said arms being extended outwardly to form a handle.

The accompanying drawing, forming a part of this specification, represents a perspective view of my improved cooking utensil, the same being shown in position on the edge of a kettle, which is represented by dotted lines.

$a$ represents a sheet-metal vessel, the bottom and side-wall of which are provided with perforations $a'$ to permit a free circulation of steam through the contents of the vessel. The upper edge of the vessel is provided with an outwardly projecting flange $a^2$.

$b$ $b$ represent wire arms attached to the vessel and extending outwardly therefrom, said arms being formed and arranged so that their outer portions will bear upon the edge of a kettle $c$ and support the vessel in the upper part of the kettle. Each arm is composed of a single piece of wire bent to form a neck 2, the side portions 3 3 extending inwardly from the neck, the inclined portions 4 4 bent downwardly from the portions 3 3 and passing through holes 7 7 in the flange $a^2$, and the hook portions 5 5 formed on the ends of the portions 4 4 and passing through holes 8 8 in the body of the vessel $a$ near the bottom thereof, the main portions of said hooks projecting upwardly on the inner surface of the vessel. The vessel is also provided with a handle $b'$ which is also composed of a single piece of wire connected to the vessel in the same manner as the wires composing the arms $b$. The side portions 3' 3' of the handle are arranged in close proximity to each other, so that the holes 7' 7' through which the parts of the handle pass are closer together than the holes 7 7, the side portions of the handle being thus held in proper relation to each other to be conveniently grasped by the hand. I prefer to provide the outer portion of the handle with a filling-piece $b^2$ composed of sheet-metal bent at its edges over the wire portion of the handle.

The outer portions of the arms are preferably bent at 9 9, where they bear upon the edge of the kettle, so that the wire of the arms will be inclined downwardly in both directions from the edge of the kettle, and will therefore prevent lateral movement of the vessel in the kettle. The wire composing the handle $b'$ may also be bent in the same way and for the same purpose, as shown at 9' 9'.

It will be seen that the wire arms attached as described to the sheet-metal vessel are securely held in place and by reason of their flexibility are enabled to be bent so as stand at any desired angle and support the vessel at various heights within the kettle. Said arms are liable to be bent or displaced during storage and shipment, but their flexibility is such that they can be readily restored to their proper position, so that the utensil is not as liable to injury as would be the case if the arms were composed of sheet-metal riveted or soldered to the body of the vessel. The construction is also cheaper than would be the case if solder or rivets were employed, it being necessary only to punch the holes in the vessel and pass the wires through the same.

The arms and handle are of such form that they do not interfere with the usual cover of the kettle, but lie between the cover and the edge of the kettle.

I claim—

1. The improved steam cooking utensil comprising a perforated sheet-metal vessel having an outwardly projecting flange at its upper edge, a series of arms each composed of a piece of wire bent to form a loop, composed of the neck-portion 2, the side-portions 3 3, the portions 4 4 passing through holes in the flange and extending downwardly therefrom toward the bottom of the vessel, and the hook portions 5 5 formed on the ends of the portions 4 4 and passing through holes in the side of the vessel, one of said arms being extended to form a handle.

2. The improved steam cooking utensil comprising a perforated sheet-metal vessel having an outwardly projecting flange at its upper edge, a series of arms each composed of a piece of wire bent to form a loop, composed of the neck-portion 2, the side-portions 3 3, the portions 4 4 passing through holes in the flange and extending downwardly therefrom toward the bottom of the vessel, and the hook portions 5 5 formed on the ends of the portions 4 4 and passing through holes in the side of the vessel, one of said arms being extended to form a handle and provided with a sheet-metal filling-piece 6.

In testimony whereof I have signed my name to this specification, in the presence of two subscribing witnesses, this 13th day of November, A. D. 1894.

HENRY O. CHENEY.

Witnesses:
C. F. BROWN,
A. D. HARRISON.